Dec. 5, 1961  R. L. OUELLETTE  3,011,590
LUBRICATOR FOR WHEELED VEHICLE
Original Filed Nov. 13, 1956  2 Sheets-Sheet 1

INVENTOR.
RAPHAEL L. OUELLETTE
BY
Buckhorn, Cheatham & Blore
ATTORNEYS

Dec. 5, 1961 R. L. OUELLETTE 3,011,590
LUBRICATOR FOR WHEELED VEHICLE
Original Filed Nov. 13, 1956 2 Sheets-Sheet 2
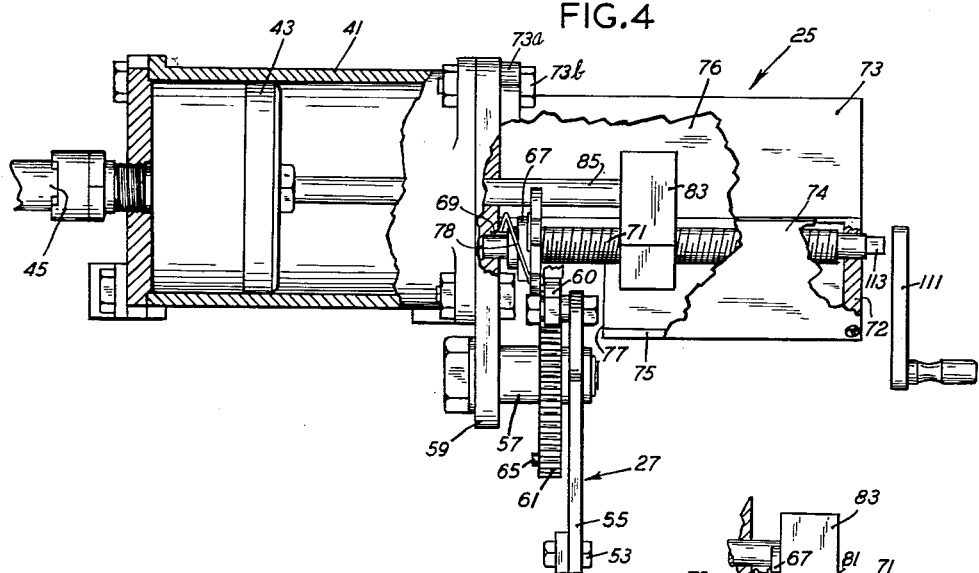
FIG.4
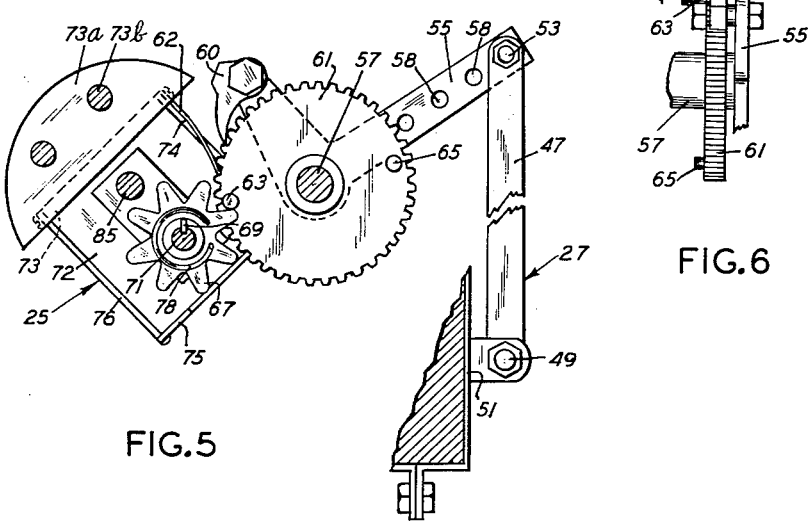
FIG.5
FIG.6
*INVENTOR.*
RAPHAEL L. OUELLETTE
BY
*ATTORNEYS*

United States Patent Office 3,011,590
Patented Dec. 5, 1961

3,011,590
LUBRICATOR FOR WHEELED VEHICLE
Raphael L. Ouellette, Portland, Oreg., assignor to Ray Flange Lubricator, Inc., Portland, Oreg., a corporation of Oregon
Continuation of application Ser. No. 621,798, Nov. 13, 1956. This application Aug. 24, 1960, Ser. No. 51,698
17 Claims. (Cl. 184—3)

The present invention relates to a lubricator for a part or parts of a wheeled vehicle, such as an automobile, but particularly for the wheels of the trucks of railroad rolling stock, such as the wheels of a coach or locomotive. For convenience, the term car truck will be used hereinafter to refer to the truck of either a coach or locomotive. This application is a continuation of my prior copending application entitled "Railroad Wheel Flange Lubricator," Serial No. 621,798, filed November 13, 1956, now abandoned.

Prior lubricators of the type under discussion have in general been unreliable because of frequent breakdowns resulting in inoperative periods, and have been complicated and expensive.

It is the main object of the present invention to provide a relatively simple and inexpensive flange lubricator for car wheels which is reliable in operation and is capable of dispensing a heavy lubricant, such as grease, in small quantities onto the flange of a car wheel.

A further object of the invention is to provide such a lubricator having an applicator so mounted on the sprung part of a car truck as readily to remain in engagement with the flange of a car wheel despite movement between such sprung part and such car wheel.

A further object of the invention is to provide such a lubricator having a positive drive to the lubricator device, which drive is interrupted at the end of a cycle of operation of the lubricator device to prevent damage to the lubricator.

A further object of the invention is to provide a lubricator having a simple and reliable drive which is operated by the relative motion between the sprung and unsprung parts of the car truck.

Another object is to provide a lubricator as above described for use on wheeled vehicles in general.

The lubricator of the present invention includes a piston and cylinder unit mounted on the sprung part of the truck frame. The piston is driven in one direction only by a motion converting means which is operated by the relative motion between the sprung and unsprung parts of the truck frame to expel a lubricant from the cylinder and into an applicator. The applicator is mounted on the sprung part of the truck frame in a manner to be in constant contact with the flange of a wheel being lubricated.

Various other objects of the invention will be apparent from the following description taken in connection with the accompanying drawings wherein:

FIG. 4 is a plan view on an enlarged scale of the lubricator taken in the direction of the arrows 4—4 in FIG. 1, parts being broken away for convenience in illustration;

FIG. 5 is a vertical sectional view on an enlarged scale taken along line 5—5 of FIG. 1 showing certain details of construction; and FIG. 6 is a view of a portion of FIG. 4, but showing the parts in a different operative position.

Figure 1:
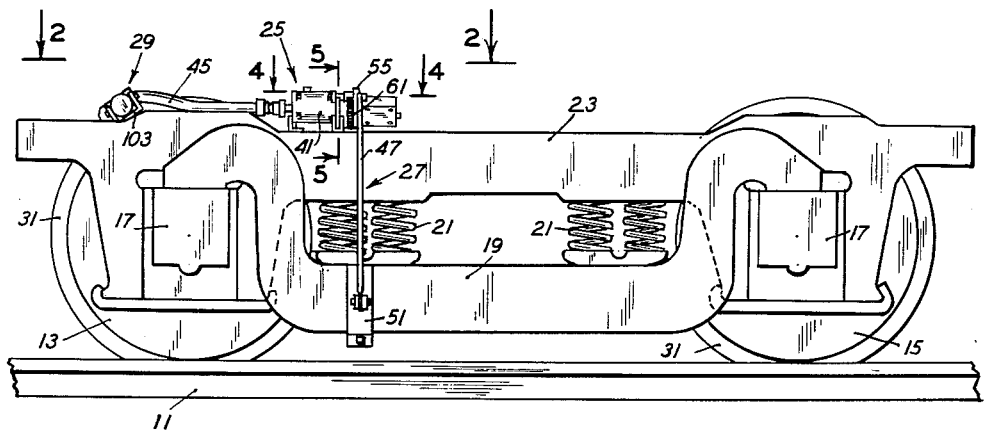
FIG. 1 is a side view in elevation of a car truck having a lubricator of the present invention mounted thereon.
Figure 2:
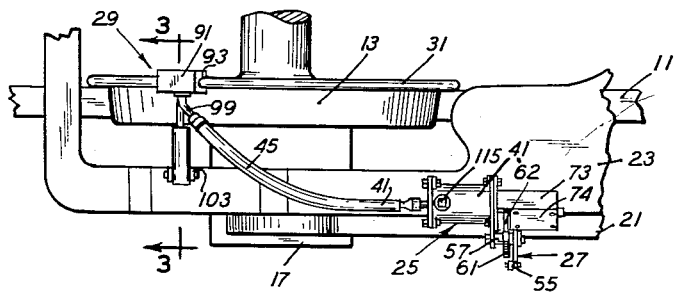
FIG. 2 is a fragmentary plan view, on a slightly enlarged scale, taken in the direction of the arrow 2—2 in FIG. 1.

Referring to FIGS. 1 and 2, the car truck shown on the rails 11 is of conventional construction and includes wheels 13 and 15, journal boxes 17, an unsprung truck frame 19, and springs 21 supporting a sprung truck frame 23.

The lubricator of the invention includes a lubricator device generally indicated at 25 mounted on the sprung part 23 of the car truck and driven by a mechanism generally indicated at 27 which is operated by the relative motion between the sprung and unsprung parts of the truck in a manner presently to be explained. An applicator unit generally indicated at 29 is connected to the lubricator device 25 to be supplied with a lubricant therefrom and to apply the lubricant to the flange 31 of the car wheel 13.

More in detail and referring to FIG. 4, the lubricator device 25 includes a cylinder 41 having a piston 43 therein adapted to be driven from right to left to discharge a heavy lubricant, such as grease, from the cylinder into a hose 45 which forms part of the applicator unit 29. The piston 43 is driven by the mechanism 27 which may be considered as a motion converting means. The motion converting means in turn may be considered as being comprised of a first motion converting mechanism and a second motion converting mechanism.

The first motion converting mechanism is best illustrated in FIGS. 1 and 5 and includes a vertical link 47 pivoted at 49 at its lower end to a strap 51 clamped around the unsprung part 19 of the truck. The link 47 is pivoted at 53 at its upper end to one end of a bellcrank lever 55 which is pivoted on a stub shaft 57. Referring to FIG. 4, the stub shaft 57 is mounted on a bracket 59 which is secured to the cylinder 41.

The lever 55 is provided with a plurality of holes 58 therealong to permit the link to be connected to the lever at various distances from stub shaft 57. This facilitates regulating the magnitude of the oscillatory motion imparted to the lever 55 by the link.

As best shown in FIG. 5, the lever 55 carries a pawl 60 engaging a ratchet wheel 61 rotatably mounted on the shaft 57. A leaf spring 62 engages the ratchet wheel 61 and holds the ratchet wheel against movement except under the influence of the pawl 60.

The link 47, lever 55, pawl 60 and ratchet wheel 61 convert the reciprocating motion between the sprung and unsprung parts of the car truck into a rotary motion. This rotary motion is converted, in turn, to a linear motion in one direction only by the second motion converting mechanism.

The second mechanism includes a pair of pins 63 and 65 carried by the ratchet wheel, pin 63 being shown as engaging one finger of a star wheel 67. As is best shown in FIG. 5, the star wheel has a splined or sliding key fit at 69 on the reduced end of a screw 71. The screw is journaled at such end in the bracket 59 and is journaled at its opposite end in an outer transversely disposed leg 72 of an L-shaped bracket, which has its other leg 73 equipped with a base flange 73a secured by bolts 73b to the bracket 59, as is best shown in FIGS. 4 and 5.

The open sides of the L-shaped bracket are closed by three plates 74, 75, and 76 which are detachably secured to the bracket. Referring to FIG. 4, plates 74 and 75 are cut out at 77 to accommodate the ratchet wheel 61, the star wheel 67 and the leaf spring 62.

Referring to FIG. 6, a coil spring 78 is arranged between the bracket 59 and the star wheel 67 urges the star wheel toward a shoulder 81 formed on the screw 71. In FIG. 4, the star wheel is against the shoulder so that the star wheel fingers will be engaged by the drive pins 63 and 65 on the ratchet wheel 61. A nut 83 in the form of a block is threaded on the screw 71 and is secured to the outer end of a piston rod 85 which has its inner end secured to the piston 43. The ratchet wheel 61, its pins 63 and 65, and the star wheel 67 constitute a speed reduction unit.

Figure 3:
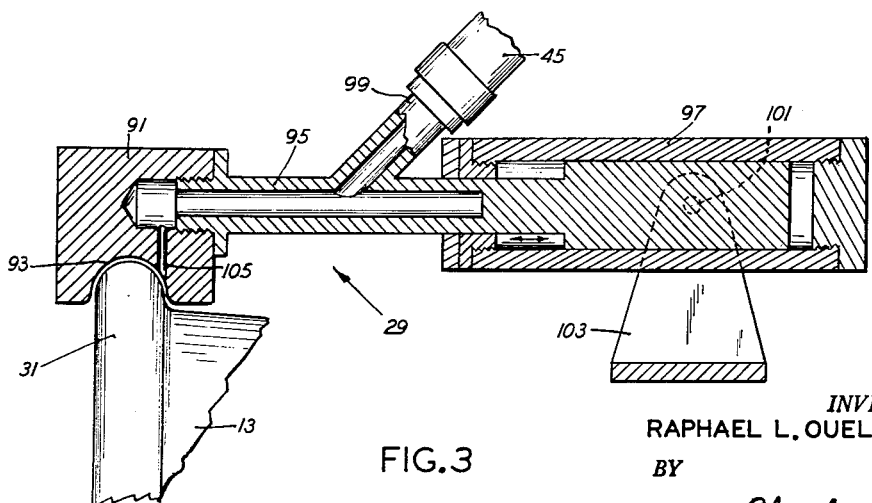
FIG. 3 is a vertical section on an enlarged scale taken through the applicator unit along line 3—3 of FIG. 2.

The applicator unit 29, previously mentioned, is best shown in FIGS. 2 and 3 and includes a hollow applicator head 91 recessed at 93 to conform to the curvature of the flange 31. The head is threaded on a shank member 95 which is circular in cross section and is slidably received within a cylinder 97. The left-hand end of the shank member 95 is hollow and the shank member is provided with a nipple 99 on which the hose 45, previously mentioned, is clamped. The cylinder 97 is pivotally mounted in a pair of trunnions 101 in a U-shaped bracket 103 for pivotal movement about an axis which extends at right angles to the axis of rotation of the wheel 13. The member 95, on the other hand, is slidable in a direction parallel to the axis of the wheel. The bracket 103 is secured to the sprung part 23 of the car truck, as is best shown in FIG. 2.

The operation of the lubricator is as follows. Referring to FIG. 5, upon the normal vertical reciprocating movement between the sprung and unsprung parts of the truck, the link 47 is relatively moved in a vertical direction with respect to the stub shaft 57 to oscillate the lever 55. The oscillating movement imparted to the lever 55 is converted into rotary movement by the pawl 60 and ratchet wheel 61. The ratchet wheel drives the star wheel 67 which in turn rotates the screw 71 to drive the nut 83 from right to left, as the parts are depicted in FIG. 4, to drive the piston 43 in the same direction. This forces the lubricant in the cylinder through the hose 45 and into head 91 and out of the head through an orifice or passage 105 formed in the head, as is best shown in FIG. 3, onto the wheel flange 31. Just before the piston 43 reaches the left-hand cylinder head, the nut 83 shifts the star wheel 57 to the left to disengage it from the pins 63 and 65. This prevents damage to the lubricator. However, before such shifting movement, there is a positive drive to the piston and thus the applicator cannot become clogged with dirt and foreign matter.

The star wheel 67 and the ratchet wheel pins 63 and 65 form a speed reducing mechanism so that the travel of the piston 43 is very slow. In fact, a railroad train having car trucks equipped with lubricators of the present invention can be driven several days without refilling the cylinder 41. To refill the lubricator cylinder 41, a handle 111, which is shown in FIG. 4, is fitted on a square end 113 of the screw 71 and the nut 83 is backed off to its original position to retract the piston 43. Referring to FIG. 2, a plug 115 on the cylinder 41 may be removed during such operation and a supply of grease inserted into the cylinder 41 through the plug opening.

Having described the invention in what is considered to be the preferred embodiment thereof, it is desired that it be understood that the invention is not to be limited other than by the provisions of the following claims.

I claim:

1. In a flange lubricator for a wheel of a car truck, a lubricator device having a piston and a cylinder operable to dispense a lubricant upon linear advancement of said piston in one direction along said cylinder, means for conducting lubricant from said device to the flange of a wheel of the car truck, driving means operated by the motion between the sprung and unsprung parts of the car truck for driving said piston in said one direction, said driving means including a ratchet wheel driven in a predetermined direction by the motion between said sprung and unsprung parts, a feed screw adjacent said ratchet wheel parallel to the axis of said ratchet wheel, a star wheel, connecting means providing a nonrotatable connection between said star wheel and said feed screw, pin means carried by said ratchet wheel for engaging said star wheel to drive the same and cause rotation of said screw, and means for converting the rotary movement of said screw into linear motion of said piston, and means operable to interrupt the drive to said piston when said piston reaches a predetermined position.

2. In a flange lubricator for a wheel of a car truck, a lubricator device having a piston and cylinder operable to dispense a lubricant upon linear advancement of said piston in one direction along said cylinder, means for conducting lubricant from said device to the flange of a wheel of the car truck, driving means operated by the motion between the sprung and unsprung parts of the car truck for driving said piston in said one direction, said driving means including a ratchet wheel driven in a predetermined direction by the motion between said sprung and unsprung parts, a feed screw adjacent said ratchet wheel parallel to the axis of said ratchet wheel, a star wheel, connecting means providing a nonrotatable connection between said star wheel and said feed screw, pin means carried by said ratchet wheel for engaging said star wheel to drive the same and cause rotation of said screw, and a nut on said feed screw to be moved longitudinally thereof upon rotation of said screw, and a connection between said nut and piston for transmitting motion of said nut to said piston, and means operable to interrupt the drive to said piston when said piston reaches a predetermined position.

3. In a flange lubricator for a wheel of a car truck, a lubricator device having a piston and cylinder operable to dispense a lubricant upon linear advancement of said piston in one direction along said cylinder, means for conducting lubricant from said device to the flange of a wheel of the car truck, driving means operated by the motion between the sprung and unsprung parts of the car truck for driving said piston in said one direction, said driving means including a ratchet wheel driven in a predetermined direction by the motion between said sprung and unsprung parts, a feed screw adjacent said ratchet wheel parallel to the axis of said ratchet wheel, a star wheel, connecting means providing a nonrotatable connection between said star wheel and said feed screw, pin means carried by said ratchet wheel for engaging said star wheel to drive the same and cause rotation of said screw, and a nut on said screw to be moved longitudinally thereof upon rotation of said screw, said piston being contained within said cylinder, a piston rod for said piston slidably projecting through one end of said cylinder, and a connection between said nut and piston rod for transmitting the motion of said nut to said piston through said rod, and means operable to interrupt the drive to said piston when said piston reaches a predetermined position.

4. In a flange lubricator for a wheel of a car truck, a lubricator device having a piston and cylinder operable to dispense a lubricant upon linear advancement of said piston in one direction along said cylinder, means for conducting lubricant from said device to the flange of a wheel of the car truck, driving means operated by the motion between the sprung and unsprung parts of the car truck for driving said piston in said one direction, said driving means including a ratchet wheel driven in a predetermined direction by the motion between said sprung and unsprung parts, a feed screw adjacent said ratchet wheel parallel to the axis of said ratchet wheel, a star wheel, connecting means providing a nonrotatable connection between said star wheel and said feed screw, pin means carried by said ratchet wheel for engaging said star wheel to drive the same and cause rotation of said screw, and means for converting the rotary movement of said screw into linear motion of said piston, said connecting means providing for longitudinal movement of said star wheel relative to said feed screw, said converting means being engageable with said star wheel as said piston nears the end of its stroke to move said star wheel lengthwise of said feed screw and separate it from said pin means to interrupt the drive to said piston.

5. In a flange lubricator for a wheel of a car truck, a lubricator device having a piston and cylinder operable to dispense a lubricant upon linear advancement of said piston in one direction along said cylinder, means for conducting lubricant from said device to the flange of a wheel of the car truck, driving means operated by the motion between the sprung and unsprung parts of the car truck for driving said piston in said one direction, said driving means including a fixed shaft, a ratchet wheel rotatably journaled on said fixed shaft and driven in a predetermined direction by the motion between said sprung and unsprung parts, a feed screw adjacent said ratchet wheel and parallel to the axis of said ratchet wheel, a star wheel, connecting means nonrotatably mounting said star wheel on said feed screw, drive pin means carried by said ratchet wheel engaging said star wheel to drive the same and cause rotation of said feed screw, and means for converting the rotary movement of said feed screw into linear motion of said piston, and means operable to interrupt the drive to said piston when said piston reaches a predetermined position.

6. In a flange lubricator for a wheel of a car truck, a lubricator device having a piston and cylinder operable to dispense a lubricant upon linear advancement of said piston in one direction along said cylinder, means for conducting lubricant from said device to the flange of a wheel of the car truck, driving means operated by the motion between the sprung and unsprung parts of the car truck for driving said piston in said one direction, said driving means including a fixed shaft, a ratchet wheel rotatably journaled on said fixed shaft and driven in a predetermined direction by the motion between said sprung and unsprung parts, a feed screw adjacent said ratchet wheel and parallel to the axis of said ratchet wheel, a star wheel, connecting means nonrotatably mounting said star wheel on said feed screw, drive pin means carried by said ratchet wheel engaging said star wheel to drive the same and cause rotation of said feed screw, a nut on said screw to be moved longitudinally thereof upon rotation of said screw, said piston being contained within said cylinder, a piston rod on said cylinder slidably projecting through one end of said cylinder, a connection between said piston rod and nut for transmitting the motion of said nut to said piston through said piston rod, said connecting means providing for longitudinal movement of said star wheel relative to said feed screw, said nut being operable to engage said star wheel near the end of the stroke of said piston and move said star wheel lengthwise of said feed screw and separate it from said drive pin means to interrupt the drive from said ratchet wheel to said piston.

7. In a flange lubricator for a wheel of a car truck, a lubricator device having a piston and cylinder operable to dispense a lubricant upon linear advancement of said piston in one direction along said cylinder, mean for conducting lubricant from said device to the flange of a wheel of the car truck, driving means operated by the motion between the sprung and unsprung parts of the car truck for driving said piston in said one direction, said driving means including a feed screw mounted in a bodily fixed position but mounted for rotary movement about its axis, said piston being contained within said cylinder, said piston having a piston rod projecting through one end of said cylinder, a nut on said feed screw connected to said piston rod for transmitting the linear motion of said nut to said piston, a drive assembly from said sprung and unsprung parts to said feed screw including a rotary element, means mounting said element on said feed screw to permit longitudinal movement of said element along said feed screw but prohibit rotary movement of said element relative to said feed screw, said nut being engageable with said element to move said element longitudinally of said screw to effect an interruption of the drive to said element.

8. In a flange lubricator for a wheel of a car truck, a lubricator device having a piston and cylinder operable to dispense a lubricant upon linear advancement of said piston in one direction along said cylinder, means for conducting lubricant from said device to the flange of a wheel of the car truck, driving means operated by the motion between the sprung and unsprung parts of the car truck for driving said piston in said one direction, said driving means including a feed screw mounted for rotary movement but prevented from endwise movement, said piston being contained within said cylinder, a piston rod for said piston slidably extending through an end of said cylinder in offset relation to the screw, means for rotating said feed screw, and means for converting the rotary motion of said feed screw into linear motion and for transmitting such linear motion to said piston rod for advancing said piston, the last-mentioned means being carried by and driven longitudinally of said feed screw for effecting an interruption in the drive to said piston as the piston nears the end of its stroke.

9. A wheel flange lubricator comprising a lubricator device having a piston and cylinder operable to dispense a lubricant upon linear advancement of said piston in one direction along said cylinder, means for conducting lubricant from said device to the flange of a wheel, driving means for driving said piston in said one direction, said driving means including a ratchet wheel to be driven in a predetermined direction by motion imparted thereto from a source of motion, a feed screw adjacent said ratchet wheel parallel to the axis of said ratchet wheel, a star wheel, connecting means providing a nonrotatable connection between said star wheel and said feed screw, pin means carried by said ratchet wheel for engaging said star wheel to drive the same and cause rotation of said screw, and means for converting the rotary movement of said screw into linear motion of said piston, said connecting means providing for longitudinal movement of said star wheel relative to said feed screw, said converting means being engageable with said star wheel as said piston nears the end of its stroke to move said star wheel lengthwise of said feed screw and separate it from said pin means to interrupt the drive to said piston.

10. A wheel flange lubricator comprising a lubricator device having a piston and cylinder operable to dispense a lubricant upon linear advancement of said piston in one direction along said cylinder, means for conducting lubricant from said device to the flange of a wheel, driving means for driving said piston in said one direction, said driving means including a fixed shaft, a ratchet wheel rotatably journaled on said fixed shaft and driven in a predetermined direction by the motion imparted thereto from a source of motion, a feed screw adjacent said ratchet wheel and parallel to the axis of said ratchet wheel, a star wheel, connecting means nonrotatably mounting said star wheel on said feed screw, drive pin means carried by said ratchet wheel engaging said star wheel to drive the same and cause rotation of said feed screw, a nut on said screw to be moved longitudinally thereof upon rotation of said screw, said piston being contained within said cylinder, a piston rod on said cylinder slidably projecting through one end of said cylinder, a connection between said piston rod and nut for transmitting tthe motion of said nut to said piston through said piston rod, said connecting means providing for longitudinal movement of said star wheel relative to said feed screw, said nut being operable to engage said star wheel near the end of the stroke of said piston and move said star wheel lengthwise of said feed screw and separate it from said drive pin means to interrupt the drive from said ratchet wheel to said piston.

11. A wheel flange lubricator comprising a lubricator device having a piston and cylinder operable to dispense a lubricant upon linear advancement of said piston in one direction along said cylinder means for conducting lubricant from said device to the flange of a wheel, driving means for driving said piston in said one direction, said driving means including a feed screw mounted in a bodily fixed position but mounted for rotary movement about its axis, said piston being contained within said cylinder, said piston having a piston rod projecting through one end of said cylinder, a nut on said feed screw connected to said piston rod for transmitting the linear motion of said nut to said piston, a rotary element, a drive assembly for imparting rotary motion to said rotary element from a source of motion, means mounting said element on said feed screw to permit longitudinal movement of said element along said feed screw but prohibit rotary movement of said element relative to said feed screw, said nut being engageable with said element to move said element longitudinally of said screw to effect an interruption of the drive to said element.

12. In a lubricator for a part of a wheeled vehicle which has incidental relative motion between certain parts as a consequence of normal operation of said vehicle, said lubricator including a lubricator device having a piston and cylinder operable to dispense a lubricant upon linear advancement of said piston in one direction along said cylinder, means for conducting lubricant from said device to the part to be lubricated, driving means operated by the motion between said certain parts for driving said piston in said one direction, said driving means including a ratchet wheel driven in a predetermined direction by the motion between said certain parts, a feed screw adjacent said ratchet wheel parallel to the axis of said ratchet wheel, a star wheel, connecting means providing a nonrotatable connection between said star wheel and said feed screw, pin means carried by said ratchet wheel for engaging said star wheel to drive the same and cause rotation of said screw, and means for converting the rotary movement of said screw into linear motion of said piston, and means operable to interrupt the drive to said piston when said piston reaches a predetermined position.

13. In a lubricator for a part of a wheeled vehicle which has incidental relative motion between certain parts as a consequence of normal operation of said vehicle, said lubricator including a lubricator device having a piston and cylinder operable to dispense a lubricant upon linear advancement of said piston in one direction along said cylinder, means for conducting lubricant from said device to the parts to be lubricated, driving means operated by the motion between said certain parts for driving said piston in said one direction, said driving means including a fixed shaft, a ratchet wheel rotatably journaled on said fixed shaft and driven in a predetermined direction by the motion between said certain parts, a feed screw adjacent said ratchet wheel and parallel to the axis of said ratchet wheel, a star wheel, connecting means nonrotatably mounting said star wheel on said feed screw, drive pin means carried by said ratchet wheel and engaging said star wheel to drive the same and cause rotation of said feed screw, and means for converting the rotary movement of said feed screw into linear motion of said piston, and means operable to interrupt the drive to said piston when said piston reaches a predetermined position.

14. In a lubricator for a part of a wheeled vehicle which has incidental relative motion between certain parts as a consequence of normal operation of said vehicle, said lubricator including a lubricator device having a piston and cylinder operable to dispense a lubricant upon linear advancement of said piston in one direction along said cylinder, means for conducting lubricant from said device to the part to be lubricated, driving means operated by the motion between said certain parts for driving said piston in said one direction, said driving means including a fixed shaft, a ratchet wheel rotatably journaled on said fixed shaft and driven in a predetermined direction by the motion between said certain parts, a feed screw adjacent said ratchet wheel and parallel to the axis of said ratchet wheel, a star wheel, connecting means nonrotatably mounting said star wheel on said feed screw, drive pin means carried by said ratchet wheel engaging said star wheel to drive the same and cause rotation of said feed screw, a nut on said screw to be moved longitudinally thereof upon rotation of said screw, said piston being contained within said cylinder, a piston rod on said cylinder slidably projecting through one end of said cylinder, a connection between said piston rod and nut for transmitting the motion of said nut to said piston through said piston rod, said connecting means providing for longitudinal movement of said star wheel relative to said feed screw, said nut being operable to engage said star wheel near the end of the stroke of said piston and move said star wheel lengthwise of said feed screw and separate it from said drive pin means to interrupt the drive from said ratchet wheel to said piston.

15. In a lubricator for a part of a wheeled vehicle which has incidental relative motion between certain parts as a consequence of normal operation of said vehicle, said lubricator including a lubricator device having a piston and cylinder operable to dispense a lubricant upon linear advancement of said piston in one direction along said cylinder, means for conducting lubricant from said device to the part to be lubricated, driving means operated by the motion between said certain parts for driving said piston in said one direction, said driving means including a feed screw mounted in a bodily fixed position but mounted for rotary movement on its axis, said piston being contained within said cylinder, said piston having a piston rod projecting through one end of said cylinder, a nut on said feed screw connected to said piston rod for transmitting the linear motion of said nut to said piston, a drive assembly from said certain parts to said feed screw including a rotary element, means mounting said element on said feed screw to permit longitudinal movement of said element along said feed screw but prohibit rotary movement of said element relative to said feed screw, said nut being engageable with said element to move said element longitudinally of said screw to effect an interruption of the drive to said element.

16. In a lubricator for a part of a wheeled vehicle which has incidental relative motion between certain parts as a consequence of normal operation of said vehicle, said lubricator including a lubricator device having a piston and cylinder operable to dispense a lubricant upon linear advancement of said piston in one direction along said cylinder, means for conducting lubricant from said device to the part to be lubricated, driving means operated by the motion between said certain parts for driving said piston in said one direction, said driving means including a feed screw mounted for rotary movement but prevented from endwise movement, said piston being contained within said cylinder, a piston rod for said piston slidably extending through an end of said cylinder in offset relation to the screw, means for rotating said feed screw, and means for converting the rotary motion of said feed screw into linear motion and for transmitting such linear motion to said piston rod for advancing said piston, the last-mentioned means being carried by and driven longitudinally of said feed screw for effecting an interruption in the drive to said piston as the piston nears the end of its stroke.

17. In a lubricator for a part of a wheeled vehicle, said lubricator including a lubricator device having a piston and cylinder operable to dispense a lubricant upon linear advancement of said piston in one direction along said cylinder, means for conducting lubricant from said device to a part to be lubricated, driving means operated from a source of motion of said vehicle for driving said piston in one direction, said driving means including a feed screw mounted for rotary movement but prevented from endwise movement, said piston being contained within said cylinder, a piston rod for said piston slidably extending through an end of said cylinder in offset relation to the screw, means for rotating said feed screw, and means for converting the rotary motion of said feed screw into linear motion and for transmitting such linear motion to said piston rod for advancing said piston, the last-mentioned means being carried by and driven longitudinally of said feed screw for effecting an interruption in the drive to said piston as the piston nears the end of its stroke.

References Cited in the file of this patent

UNITED STATES PATENTS

| | | |
|---|---|---|
| 121,893 | Percival | Dec. 12, 1871 |
| 648,386 | Byington | May 1, 1900 |
| 1,212,715 | Van Guysling | Jan. 16, 1917 |
| 1,622,027 | Couchman et al. | Mar. 27, 1927 |
| 1,685,040 | Zbinden | Sept. 18, 1928 |
| 2,637,411 | Harbison | May 5, 1953 |
| 2,656,898 | Kelly | Oct. 27, 1953 |

FOREIGN PATENTS

| | | |
|---|---|---|
| 22,678 | Great Britain | 1891 |